US012580439B2

(12) United States Patent
Park et al.

(10) Patent No.: US 12,580,439 B2
(45) Date of Patent: Mar. 17, 2026

(54) MOTOR INCLUDING A JOINT INCLUDING FIRST AND SECOND STEP PARTS FOR IMPROVING ROBUSTNESS AGAINST AN AXIAL LOAD

(71) Applicant: LG INNOTEK CO., LTD., Seoul (KR)

(72) Inventors: Kyoung Min Park, Seoul (KR); Ju Hwan Ku, Seoul (KR); Jae Young Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 187 days.

(21) Appl. No.: 18/550,312

(22) PCT Filed: Apr. 13, 2022

(86) PCT No.: PCT/KR2022/005358
§ 371 (c)(1),
(2) Date: Sep. 13, 2023

(87) PCT Pub. No.: WO2022/220585
PCT Pub. Date: Oct. 20, 2022

(65) Prior Publication Data
US 2024/0171032 A1 May 23, 2024

(30) Foreign Application Priority Data
Apr. 15, 2021 (KR) ........................ 10-2021-0049101

(51) Int. Cl.
*H02K 5/04* (2006.01)
(52) U.S. Cl.
CPC .................................... *H02K 5/04* (2013.01)
(58) Field of Classification Search
CPC ............ H02K 5/00; H02K 5/04; H02K 7/003; H02K 2213/03
See application file for complete search history.

(56) References Cited

U.S. PATENT DOCUMENTS

2015/0263582 A1* 9/2015 Miyashita ................ H02K 5/15
310/90
2016/0065033 A1* 3/2016 Saito ...................... H02K 1/145
454/339

FOREIGN PATENT DOCUMENTS

JP 3715519 B2 * 11/2005
JP 2012-80733 A 4/2012
(Continued)

OTHER PUBLICATIONS

Machine Translation of JP 3715519 B2 (Year: 2005).*
(Continued)

*Primary Examiner* — Alexander A Singh
*Assistant Examiner* — Charlie Frank Mann, Jr.
(74) *Attorney, Agent, or Firm* — Saliwanchik, Lloyd & Eisenschenk

(57) ABSTRACT

The present invention may provide a motor including a housing, a stator disposed in the housing, a rotor disposed in the stator, and a shaft coupled to the rotor, wherein the housing includes a first housing, the first housing includes a main body, a flange, and a joint disposed between the flange and the main body in an axial direction, the flange includes holes, the joint includes first step parts and second step parts which protrude further outward than an outer surface of the main body in a radial direction, and the first step parts and the second step parts are symmetrically disposed with respect to a reference line passing through a center of one of the holes and a center of the first housing.

12 Claims, 7 Drawing Sheets

(56) References Cited

FOREIGN PATENT DOCUMENTS

| JP | 2018-68000 | A | 4/2018 |
|----|------------|---|--------|
| JP | 2019-68602 | A | 4/2019 |
| JP | 2019068554 | A | 4/2019 |
| KR | 101457655 | B1 | 11/2014 |
| KR | 102027396 | B1 | 11/2019 |
| KR | 102190270 | B1 | 12/2020 |

OTHER PUBLICATIONS

International Search Report dated Jul. 19, 2022 in International Application No. PCT/KR2022/005358.
Supplementary European Search Report dated May 8, 2024 in European Application No. 22788440.0.
Office Action dated Dec. 16, 2025 in Japanese Application No. 2023-521387.

* cited by examiner

MOTOR INCLUDING A JOINT INCLUDING FIRST AND SECOND STEP PARTS FOR IMPROVING ROBUSTNESS AGAINST AN AXIAL LOAD

CROSS-REFERENCE TO RELATED APPLICATIONS

This application is the U.S. national stage application of International Patent Application No. PCT/KR2022/005358, filed Apr. 13, 2022, which claims the benefit under 35 U.S.C. § 119 of Korean Application No. 10-2021-0049101, filed Apr. 15, 2021, the disclosures of each of which are incorporated herein by reference in their entirety.

TECHNICAL FIELD

An embodiment relates to a motor.

BACKGROUND ART

Generally, in a motor, a rotor rotates by an electromagnetic interaction between the rotor and a stator. In this case, a shaft connected to the rotor also rotates to generate a rotational driving force.

The rotor and the stator are accommodated in a housing. The housing may include a cylindrical hollow main body and a flange disposed on an end portion of the main body. The flange is coupled to an external apparatus. Since the flange is disposed to extend further outward than the main body, a joint between the main body and the flange has to have a substantially curved shape.

However, since such a shape of the housing is difficult to manufacture, there are problems that a manufacturing process is complex, and the cost increases. In addition, there is a problem of being vulnerable to an axial load.

Technical Problem

Accordingly, an embodiment is intended to solve the above problems and directed to providing a motor which is easily manufactured and is robust against an axial load.

Objectives to be achieved by the present invention are not limited to the above-described objective, and other objectives which are not described above will be clearly understood by those skilled in the art through the following descriptions.

Technical Solution

An embodiment provides a motor including a housing, a stator disposed in the housing, a rotor disposed in the stator, and a shaft coupled to the rotor, wherein the housing includes a first housing, the first housing includes a main body, a flange, and a joint disposed between the flange and the main body in an axial direction, the flange includes holes, the joint includes first step parts and second step parts which protrude further outward than an outer surface of the main body in a radial direction, and the first step parts and the second step parts (ST2) are symmetrically disposed with respect to a reference line passing through a center of one of the holes and a center of the first housing.

Another embodiment provides a motor including a housing, a stator disposed in the housing, a rotor disposed in the stator, and a shaft coupled to the rotor, wherein the housing includes a first housing, the first housing includes a main body, a flange, and a joint disposed between the flange and the main body in an axial direction, the flange includes a hole, the joint includes a protruding part protruding further outward than an outer surface of the main body in a radial direction, a concave region and a convex region are continuously disposed in the protruding part in the radial direction, and the concave region is disposed to correspond to the hole.

Advantageous Effects

According to an embodiment, there is an advantage of easily manufacturing a housing by applying a step structure to a joint connecting a flange and a main body.

According to the embodiment, there is an advantage of securing robustness against an axial load through a first step part and a second step part (ST2) symmetrically disposed in the joint.

According to the embodiment, there is an advantage of further improving the robustness against the axial load by attaching a second housing to a first housing.

According to the embodiment, there is an advantage of uniformly supporting the axial load by rotationally and symmetrically arranging a plurality of first step parts and a plurality of second step parts.

DESCRIPTION OF DRAWINGS

FIG. 3 is a side cross-sectional view of the first housing taken along line A-A of FIG. 2.

MODES OF THE INVENTION

A direction parallel to a longitudinal direction (vertical direction) of a shaft will be referred to as an axial direction, a direction perpendicular to the axial direction about the shaft will be referred to as a radial direction, and a direction along a circumference of a circle having a radius in the radial direction about the shaft will be referred to as a circumferential direction.

Figure 1:
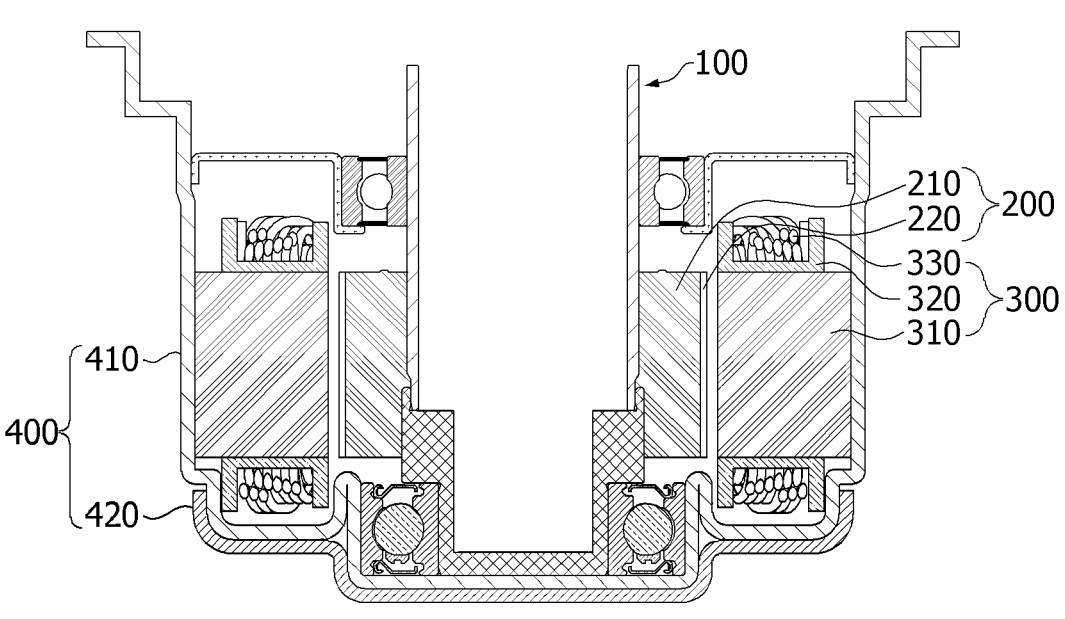
FIG. 1 is a view illustrating a motor according to an embodiment.

FIG. 1 is a view illustrating a motor according to an embodiment.

Referring to FIG. 1, the motor according to the embodiment may include a shaft 100, a rotor 200, a stator 300, and a housing 400. Hereinafter, the term "inward" refers to a direction from the housing 400 toward the shaft 100 which is a center of the motor, and the term "outward" refers to a direction opposite to "inward," that is, the direction from the shaft 100 toward the housing 400. In addition, hereinafter, the radial direction is defined based on an axial center of the shaft 100.

The shaft 100 may be coupled to the rotor 200. When a current is supplied so that an electromagnetic interaction occurs between the rotor 200 and the stator 300, the rotor 200 rotates, and the shaft 100 rotates in conjunction with the rotation of the rotor 200. The shaft 100 may be a hollow member. A shaft of an external apparatus may be inserted into the shaft 100.

The rotor 200 rotates through an electrical interaction with the stator 300. The rotor 200 may be disposed inside the stator 300.

The stator 300 is disposed outside the rotor 200. The stator 300 may include a stator core 310, an insulator 320 mounted on the stator core 310, and a coil 330. The coil 330 may be wound around the insulator 320. The insulator 320 is disposed between the coil 330 and the stator core 310 to serve to electrically insulate the stator core 310 from the coil 330. The coil 330 induces an electrical interaction with a magnet of the rotor 200.

The housing 400 may include a first housing 410 and a second housing 420. The stator 300 and the rotor 200 are disposed inside the first housing 410. In addition, the second housing 420 is disposed to be attached to an outer surface of the first housing 410.

Figure 2:
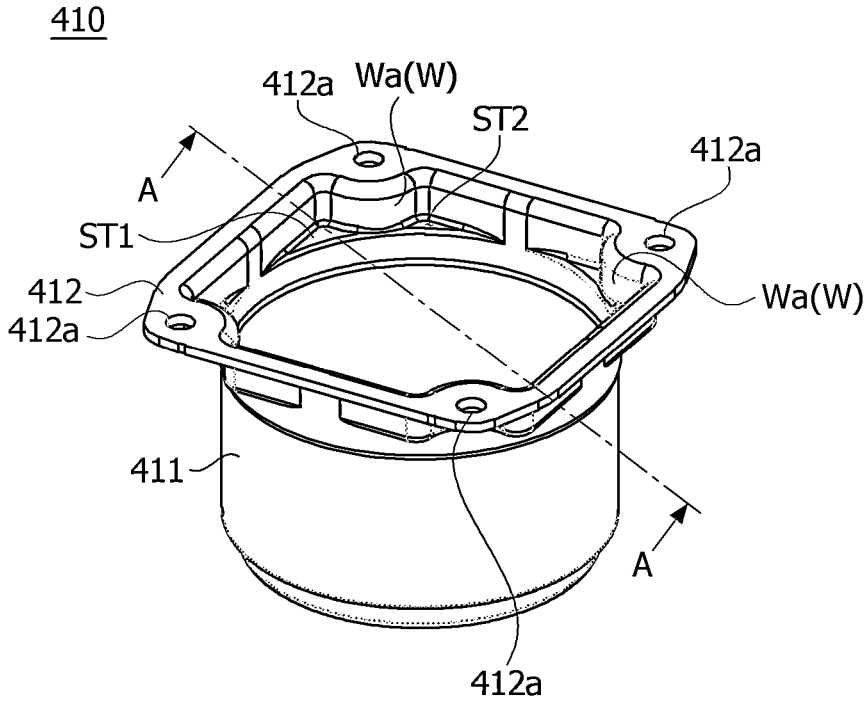
FIG. 2 is a perspective view of a first housing illustrated in FIG. 1.
Figure 3:
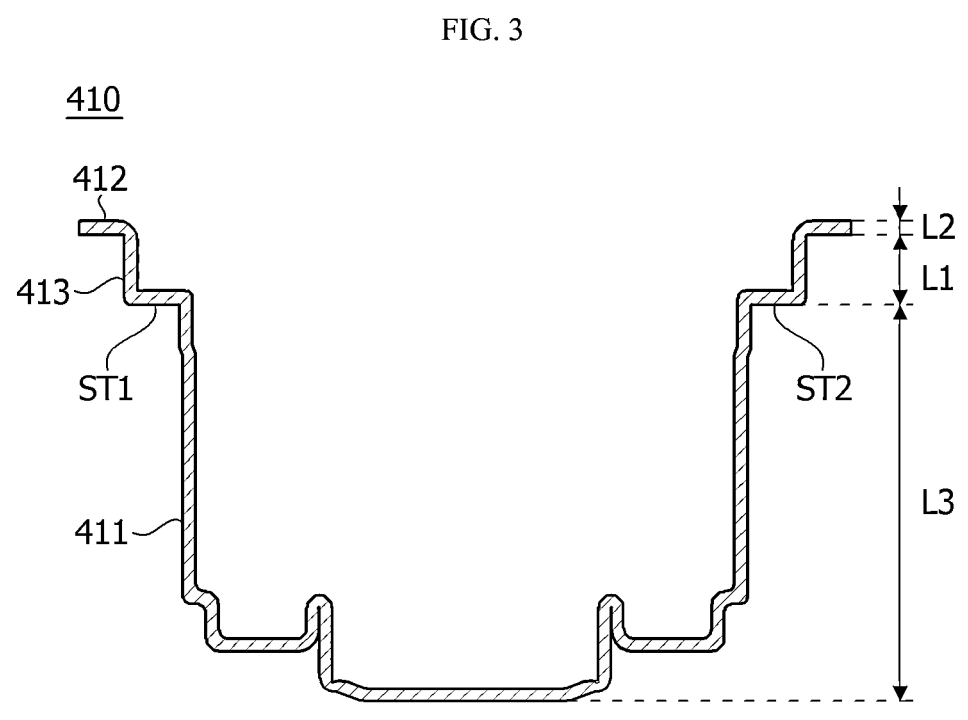
Figure 4:
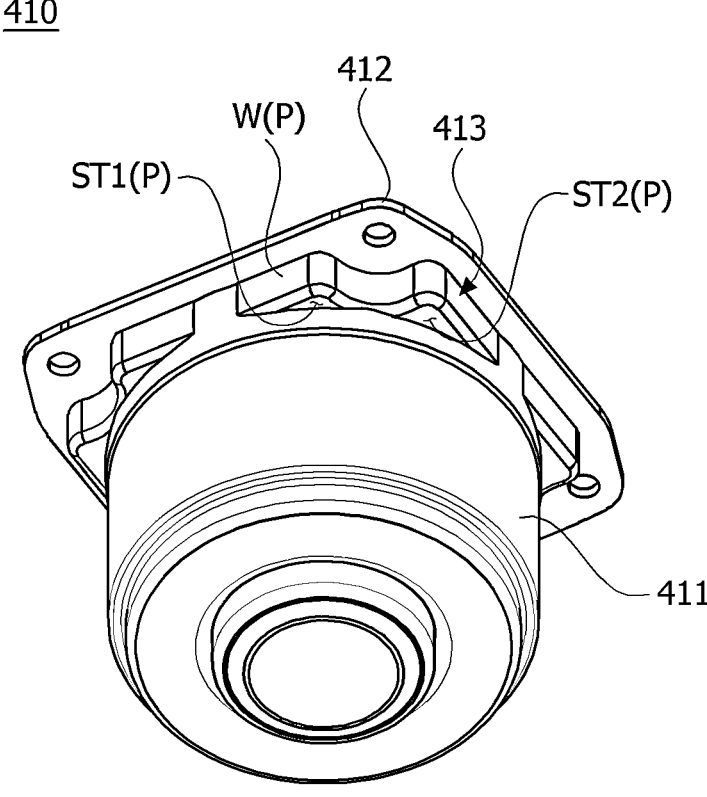
FIG. 4 is a bottom view of the first housing illustrated in FIG. 1.
Figure 5:
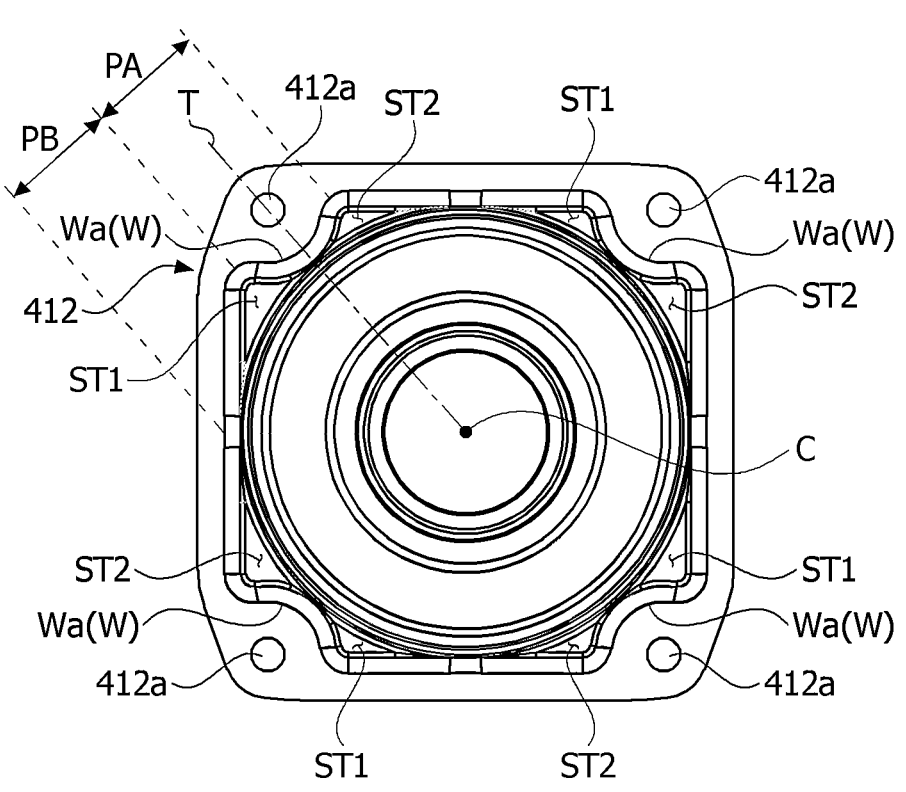
FIG. 5 is a plan view of the first housing illustrated in FIG. 1.

FIG. 2 is a perspective view of the first housing 410 illustrated in FIG. 1, FIG. 3 is a side cross-sectional view of the first housing 410 taken along line A-A of FIG. 2, FIG. 4 is a bottom view of the first housing 410 illustrated in FIG. 1, and FIG. 5 is a plan view of the first housing 410 illustrated in FIG. 1.

Referring to FIGS. 2 to 5, the first housing 410 may include a main body 411, a flange 412, and a joint 413.

The main body 411 is a cylindrical member and accommodates the rotor 200 and the stator 300 therein.

The flange 412 is disposed at an end portion of the main body 411 to be fastened with the external apparatus. The flange 412 is disposed to protrude further than the main body 411 in the radial direction. A plurality of holes 412a may be disposed in the flange 412. Each of the holes 412a is a hole through which a fastening member passes. The flange 412 may have a substantially polygonal shape. The hole 412a may be disposed around a corner of the flange 412.

The joint 413 connects the main body 411 and the flange 412. The joint 413 may be disposed between the main body 411 and the flange 412 in the axial direction. The joint 413 serves to improve robustness against an axial load. Particularly, when the shaft of the external apparatus is inserted into the shaft 100 and an axial load is applied to the housing 400, a connecting portion between the flange 412 and the main body 411 may be vulnerable to the axial load due to a structural difference between the flange 412 and the main body 411, but this may be supplemented through the joint 413 which will be described below.

The joint 413 may include a protruding part P protruding further than an outer surface of the main body 411 in the radial direction. The protruding part P may be disposed around the hole 412a of the flange 412. In the protruding part P, a convex region PB and a concave region PA may be continuously disposed in the radial direction. In this case, the concave region PA is disposed to correspond to the hole 412a.

A specific structure of the protruding part P will be described below.

The joint 413 may include a first step part ST1, a second step part ST2, and a sidewall as the protruding part P. The first step part ST1 and the second step part ST2 may be disposed on a plane perpendicular to axial direction at one end of the main body 411. The sidewall connects the first step part ST1 and second step part ST2 to the flange 412. The first step part ST1, the second step part ST2, and the sidewall W are formed to protrude further outward than the outer surface of the main body 411 in the radial direction.

The sidewall W is perpendicularly connected to the first step part ST1 and the second step part ST2.

The first step part ST1 and the second step part ST2 are disposed around the hole 412a of the flange 412. In addition, the first step part ST1 and the second step part ST2 may be symmetrically disposed with respect to a reference line T. The reference line T corresponds to a virtual straight line passing through a center of the hole 412a and a center C of the first housing 410. Since the first step part ST1 and the second step part ST2 are symmetrically disposed with respect to the hole 412a, a fastening space of the flange 412 is secured around the hole 412a and the robustness against the axial load can also be uniformly secured.

Shapes and sizes of the first step part ST1 and the second step part ST2 may be the same.

The first step part ST1 and the second step part ST2 are disposed on the plane perpendicular to the axial direction and perpendicularly connected to the sidewall W connected to the flange 412. In addition, the first step part ST1 and the second step part ST2 are perpendicularly connected to the main body 411. The first step part ST1 and the second step part ST2 serve to improve the robustness against the axial load.

The first step part ST1 and the second step part may be disposed as a plurality of first step parts ST1 and a plurality of second step parts ST2. The first step part ST1 and the second step part ST2 may be disposed as one set corresponding to the hole 412a disposed around the corner of the flange 412. Shapes and sizes of the plurality of first step parts ST1 may be the same. The plurality of first step part ST1 may be rotationally and symmetrically disposed with respect to the center C of the first housing 410. In addition, shapes and sizes of the plurality of second step parts ST2 may also be the same. The plurality of second step parts ST2 may be rotationally and symmetrically disposed with respect to the center C of the first housing 410.

The sidewall W includes a curved surface Wa. The curved surface Wa protrudes toward the center C of the first housing 410. The curved surface Wa is disposed to correspond to the hole 412a. The curved surface Wa may be disposed as a plurality of curved surfaces Wa. The plurality of curved surfaces Wa may be rotationally and symmetrically disposed with respect to the center C of the first housing 410. Curvatures and sizes of the plurality of curved surfaces Wa may be the same. The curved surface Wa has features of securing a fastening space of the flange 412 at the outside of the main body 411 and improving robustness of the sidewall W against the axial load.

In the axial direction, an inner edge of the flange 412 may have a "W" shape around the curved surface Wa.

A length L1 of the joint 413 in the axial direction is greater than a length L2 of the flange 412 in the axial direction and smaller than a length L3 of the main body 411 in the axial direction.

As illustrated in FIG. 5, when viewed in the axial direction, a sum of an area of all the first step parts ST1 and an area of all the second step parts ST2 is smaller than a sum of an area of the flange 412. When the sum of the area of all the first step parts ST1 and the area of all the second step parts ST2 is greater than the area of the flange 412, the motor may be rather vulnerable to the axial load.

Figure 6:
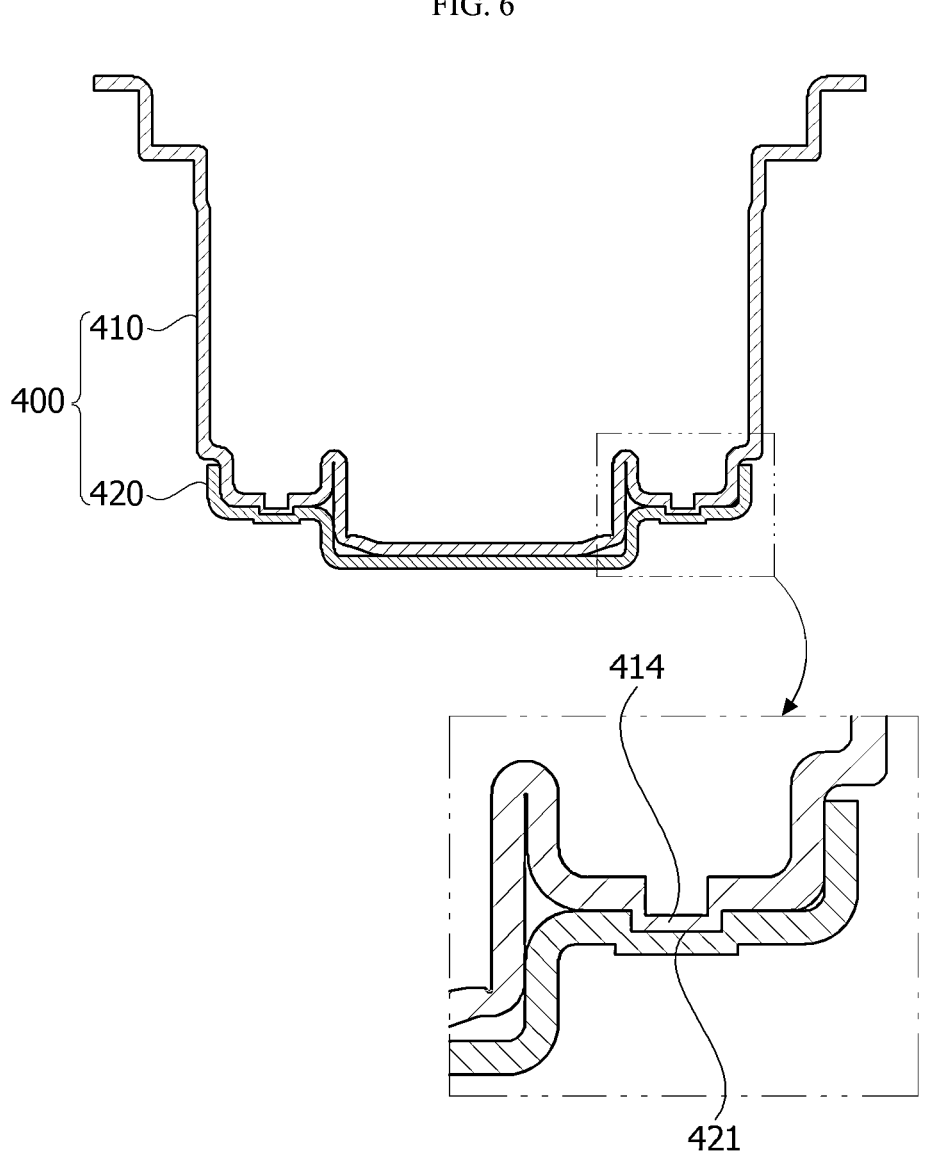
FIG. 6 is a view illustrating a state in which the first housing and a second housing are coupled.

FIG. 6 is a view illustrating a state in which the first housing 410 and the second housing 420 are coupled.

Referring to FIG. 6, the second housing 420 may be disposed to be attached to a lower end portion of the first housing 410. The second housing 420 may be disposed to surround the lower end portion of the first housing 410. The lower end portion of the first housing 410 may be disposed as a multistage type for assembling with the second housing 420. The second housing 420 may be slid to be assembled with or fitted to the lower end portion of the first housing 410.

The first housing 410 may include a first coupling part 414 in a contact region between the first housing 410 and the second housing 420. In addition, the second housing 420 may include a second coupling part 421 coupled to the first coupling part 414.

The first coupling part 414 may be a protrusion and the second coupling part 421 may be a groove. The first coupling part 414 and the second coupling part 421 may be formed through a clinching process.

The second housing 420 supplements robustness against the axial load at the lower end portion of the first housing 410 to reduce deformation of the housing 400.

Figure 7A:
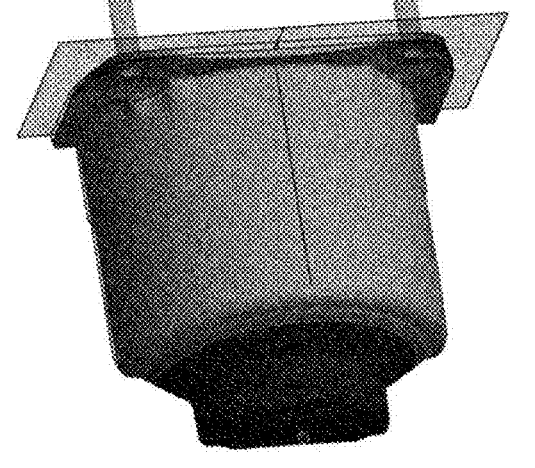
FIGS. 7A and 7B are a set of views for comparing a degree of deformation of a housing of a motor according to a comparative example against an axial load and a degree of deformation of a housing of the motor according to the embodiment against an axial load.
Figure 7A:
Figure 7B:
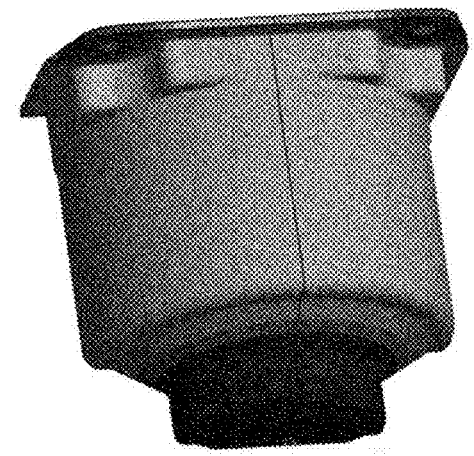

FIGS. 7A and 7B are a set of views for comparing a degree of deformation of a housing of a motor according to a comparative example against an axial load and a degree of deformation of a housing of the motor according to the embodiment against an axial load.

In the same axial load condition, FIG. 7A is a view showing the degree of deformation of the housing of the motor against the axial load according to the comparative example and FIG. 7B is a view showing the degree of deformation of the housing of the motor against the axial load according to the embodiment. As can be seen visually, in the same axial load condition, it can be seen that larger deformation occurs around a flange of the housing of the motor according to the comparative example when compared to that according to the embodiment.

Specifically, as illustrated in FIG. 7A, the degree of deformation of the housing of the motor against the axial load according to the comparative example is that a change in a length of the housing in the axial direction is 0.129 mm in an axial load condition of 7000 N/m, however, as illustrated in FIG. 7B, the degree of deformation of the house of the motor against the axial load according to the embodiment is that a change in a length of the housing in the axial direction is 0.103 mm in the axial load condition of 7000 N/m, which shows that the robustness of the motor according to the embodiment is higher than the robustness of the motor according to the comparative example by about 20.15%.

In the above-described embodiment, an example of an inner rotor type motor has been described, but the present invention is not limited thereto. The present invention may also be applied to an outer rotor type motor. In addition, the present invention may be used in various devices for vehicles, home appliances, or the like.

The invention claimed is:

1. A motor comprising:
a housing;
a stator disposed in the housing;
a rotor disposed in the stator; and
a shaft coupled to the rotor,
wherein the housing includes a first housing,
the first housing includes a main body, a flange, and a joint disposed between the flange and the main body in an axial direction,
the flange includes a plurality of holes, the joint includes a plurality of first step parts and a plurality of second step parts that protrude further outward than an outer surface of the main body in a radial direction, and
the plurality of first step parts and the plurality of second step parts are symmetrically disposed with respect to a reference line passing through a center of one of the plurality of holes and a center of the first housing,
wherein shapes and sizes of the plurality of first step parts are identical and shapes and sizes of the plurality of second step parts are identical, while the shape and the size of the plurality of first step parts are different from the shape and the size of the second step parts.

2. The motor of claim 1, wherein:
the joint includes a sidewall that connects the plurality of first step parts and the plurality of second step parts to the flange; and
the sidewall includes curved surfaces protruding toward the center of the first housing.

3. The motor of claim 2, wherein the curved surfaces are disposed to correspond to the plurality of holes.

4. The motor of claim 3, wherein:
the plurality of first step parts and the plurality of second step parts are disposed to correspond to the plurality of holes, respectively, and
wherein the plurality of first step parts and the plurality of second step parts are not connected to the plurality of holes.

5. The motor of claim 2, wherein the curved surfaces are rotationally and symmetrically disposed with respect to the center of the first housing.

6. The motor of claim 2, wherein:
in the axial direction, an inner edge of the flange has a "W" shape around the curved surface.

7. The motor of claim 1, wherein:
the plurality of first step parts are rotationally and symmetrically disposed with respect to a center of the housing; and
the plurality of second step parts are rotationally and symmetrically disposed with respect to the center of the housing.

8. The motor of claim 1, wherein the plurality of first step parts are rotationally and symmetrically disposed with respect to a center of the housing; and
the plurality of first step parts and the plurality of second step parts are disposed on a plane perpendicular to the axial direction.

9. The motor of claim 1, wherein a length of the joint in the axial direction is greater than a length of the flange in the axial direction and smaller than a length of the main body in the axial direction.

10. The motor of claim 1, wherein when viewed in the axial direction, a sum of an area of all the plurality of first step parts and an area of all the plurality of second step parts is smaller than a sum of an area of the flange.

11. The motor of claim 1, wherein:
the housing includes a second housing;
the first housing includes a first coupling part located in a contact region connecting with the second housing; and
the second housing includes a second coupling part coupled to the first coupling part.

12. The motor of claim 1, wherein:
the joint includes a protruding part, and the protruding part includes a convex region and a concave region that are continuously disposed in the radial direction, and the concave region is disposed to correspond to the plurality of holes.

* * * * *